United States Patent Office 3,506,442

Patented Apr. 14, 1970

3,506,442

PHOTOMASK MODIFICATION AND REGISTRATION TEST METHODS

Robert E. Kerwin, Westfield, N.J., assignor to Bell Telephone Laboratories, Incorporated, Murray Hill and Berkeley Heights, N.J., a corporation of New York No Drawing. Filed Sept. 27, 1968, Ser. No. 763,348
Int. Cl. G03c 5/04
U.S. Cl. 96—41 4 Claims

ABSTRACT OF THE DISCLOSURE

A technique for recording the registration of a sequence of photomasks involves introducing and physically developing separate successive images on a single substrate. The image area of a photomask may also be modified by a similar reiterative technique of sensitizing and physically developing.

BACKGROUND OF THE INVENTION

(1) Field of the invention

This invention relates to photographic emulsions. More particularly, the present invention relates to a reiterative technique for sensitizing and physically developing photographic emulsions.

(2) Description of the prior art

In recent years, considerable interest has been generated in a novel image recording technique which is capable of producing thin grainless images of high contrast on a variety of substrates. This technique involves the use of highly absorbing light sensitive compounds in molecular dispersion applied in thin non-scattering layers which, upon exposure to light, form a latent image capable of nucleating a metallic image and being amenable to image intensification in a developer solution comprising silver ions, a reducing agent and a cationic stabilizer. Continued investigation of this technique has resulted in a family of processes with high resolving power, intermediate photographic speed and variable photographic gamma, such being of interest in photolithographic processing.

The unique characteristics of such technique have in turn generated sufficient interest to warrant the investigation of their applicability in the photolithographic processing of semiconductors and integrated circuits with a view toward solving some of the difficulties encountered therein.

For example, in the fabrication of integrated circuits, it is conventional to employ a plurality of sequential registered photolithographic operations utilizing a series of photomasks, each of which is prepared independently. Registration of the members of the mask set is critical since misalignment of the elements of a device or the components of a circuit prepared in accordance with such techniques will lead to device failure. The prior art procedure for testing mask registration involves overlaying the successive masks and checking their registration microscopically. Unfortunately, this procedure fails to provide a permanent registration record and is seriously limited by depth of focus limitations of the microscope employed. A more accurate prior art technique for attaining this end involves fabrication of a complete device and subsequent microscopic examination thereof, an expensive and time consuming operation.

Another prominent difficulty commonly encountered in photolithographic processing techniques is the necessity for the fabrication of mask sets which differ from each other in minor aspects.

SUMMARY OF THE INVENTION

In accordance with the present invention, the prior art difficulties alluded to hereinabout are effectively obviated by a novel series of processing steps which avail themselves of certain characteristics inherent in the physical development process, thereby permitting the recording of the registration of a photographic mask set or, alternatively, permitting the modification of existing photomasks by the imagewise addition or subtraction of exposed areas.

The present invention has been described largely in terms of a technique for recording the registration of a photographic mask set destined for use sequentially in the fabrication of integrated circuits, such being considered the preferred embodiment. However, it will be understood by those skilled in the art that the basic inventive concept described herein may be employed equally as well for modifying existing photographic masks by the addition or subtraction of design or labeling features.

In accordance with the preferred embodiment of the present invention, a recording medium is successively sensitized, exposed and physically developed in a series of repetitive steps, exposure being effected in each successive step through the photomasks to be employed sequentially in the fabrication of an integrated circuit. Ultimately, the resultant product is examined microscopically to determine the registration of the superimposed masks.

In the practice of the alternative embodiments of the present invention, an existing photographic mask is modified either by image addition or image deletion. In the case of image addition, the procedure involves resensitizing an existing photographic mask, exposing the resensitized emulsion through a mask which defines the image area to be added, and subjecting the resultant mask to physical development. Similarly, image deletion is effected by preparing a contact printed negative of the photographic mask resensitizing the negative, exposing the negative through a mask which defines the image area to be deleted, subjecting the resultant negative to physical development and making a positive of the resultant negative.

DETAILED DESCRIPTION OF THE INVENTION

A general outline suitable for use in the practice of the present invention will now be given. Certain operating parameters and ranges are indicated.

The first step in the practice of the preferred embodiment of this invention involves selecting a suitable recording medium, a flat glass substrate coated with a uniform layer of gelatin hardened by chemical crosslinking reactions with aldehydes being found suitable.

The chemical basis of a photographic system suitable for successive recordings of the type described herein is known to those skilled in the art (see, for example, U.S. Patent 2,735,773, issued on Feb. 21, 1956, and U.S. Patent 2,738,272, issued on Mar. 13, 1956). The technique described herein involves sensitizing a gelatin coated plate by a brief immersion in an aqueous solution of a light sensitive aromatic diazosulphonate, the solution also containing a suitable non-ionic wetting agent to facilitate uniform absorption of the sensitizer by the gelatin, and a salt, typically cadmium lactate, which serves to prevent regression of the photochemical reaction after exposure. For the purposes of the present invention, the sensitizing solution contains from 0.1 to 1.0 mole of sensitizer per liter of solution.

Following, sensitization, the gelatin coated plate is exposed through the first of any series of photolithographic masks whose registration it is desired to test, exposure being effected in the presence of ultraviolet light of a high pressure mercury vapor lamp by either contact or projection printing. The wavelength of the light employed as the exposing medium suitably ranges from 325–450 nanometers, such limitation being dictated by the wavelengths of maximum absorption for the sensitizer employed.

Immediately after exposure, the coated substrate is immersed for a time period typically ranging from 2–10 seconds in a suitable medium comprising an aqueous solution of mercurous and silver ions, the latent image formed on exposure serving to nucleate a silver-amalgam metallic image. Typical concentration of the components of this bath, termed the disproportionation bath are well known and are further described in the following exemplary embodiment. However, the photographic gamma, defined as the slope of the optical density versus exposure characteristic curve bears a direct relationship to the concentration of silver in the bath.

The image is next intensified by developing for a time period ranging from 1–10 minutes in a conventional physical developer solution, such solution typically containing silver ions, a reducing agent such as a compound capable of yielding ferrous ions and a suitable cationic stabilizer. During the course of the physical development process, silver is selectively deposited on the amalgam nuclei by means of the catalytic reduction of silver ion by ferrous ion, so resulting in the formation of a black negative image of the original mask. The preceding cycle of sensitization, exposure, nucleation and development is then repeated to record each of the sequential photolithographic masks of interest on one substrate.

In the practice of the preferred embodiment, as described, minimal physical development of each successive image is employed so as to avoid overdevelopment of the first recorded images during subsequent developments. Thus, each development is conveniently limited to attaining an image optical density of 0.15 and eight such successive cycles maybe undertaken without appreciable image fogging or overgrowth. However, in the practice of the alternative embodiments of the invention involving mask modification when the modified mask image must have an optical density in excess of 1.5 to serve as an effective photolithographic mask, full physical development is employed at least once.

Examples of the application of the present invention are set forth below. The examples have been furnished for illustrative purposes only, and it will be appreciated by those skilled in the art that they are not to be considered as limiting.

EXAMPLE I

The substrate employed was a 2″ x 2″ x 0.060″ glass plate coated with a 2 micron thick film of gelatin hardened by a cross-linking reaction with formaldehyde at 70° C. Sensitization of the gelatin coated plate was effected by immersion in an aqueous 0.4 M solution of p-methoxybenzene-diazosulphonate and 0.1 M cadmium lactate, the pH of the resultant solution being adjusted to 4.5 with lactic acid. Sensitization and all subsequent operations were conducted in the presence of gold fluorescent lighting.

Following, the sensitized plate was exposed through the first of a set of photomasks whose registration it was desired to test by projection printing. Ultraviolet light having a wavelength of 325 nanometers was used for a 12 second exposure. Thereafter, nucleation of a metallic latent image was effected by a four second immersion of the exposed plate in a bath comprising 0.01 N mercurous nitrate, 0.003 N silver nitrate, and 0.01 N nitric acid. Physical development of the resultant plate was next effected by immersion in a stabilized solution containing 0.2 M ferrous ammonium sulphate, 0.08 M ferric nitrate, 0.1 M citric acid, 0.1 M silver nitrate and 0.04 percent, by weight, dodecylamine acetate. Each of the solutions employed in the foregoing steps contained a few drops of a non-ionic wetting agent and a final rinse of the physically developed plate was effected by immersion in the same wetting agent. The foregoing procedure was repeated five times with the remaining masks of the set of interest and the registration of the mask set was determined at the conclusion of the operation by visual examination.

EXAMPLE II

This example describes a method for adding information to a previously recorded image on an existing photographic plate.

The plate employed was a commercial high resolution emulsion plate bearing an image of a pattern. The plate was resensitized in the manner described in Example I and positioned in an alignment fixture for the purpose of assuring registration with the image information to be added. Next, the plate was exposed through this mask and developed in accordance with the procedure of Example I to a full optical density of 1.5. The resultant plate included the information to be added in registration and was suitable for use as a photolithographic mask.

EXAMPLE III

This example describes a method for deleting information from a previously recorded image in an existing photographic plate.

The plate employed is a commercial high resolution emulsion plate bearing an image of a pattern. A negative of the pattern of this plate is then obtained by contact printing upon another high resolution plate. The negative is then resensitized as described in Example I and positioned in an alignment fixture for the purpose of assuring registration with the image information to be added thereto (releted from the original image). Next, the negative is exposed through this mask and developed in accordance with the procedure of Example I to a full optical density of 1.5. Following, a contact print is made of the resultant negative, the contact print being the desired modified mask having the appropirate information deleted therefrom.

What is claimed is:

1. A method for recording and testing the registration of sequential mask sets destined for use in the fabrication of an integrated circuit comprising the steps of (a) sensitizing a gelatin coated plate by immersion in an aqueous solution of a light sensitive aromatic diazosulfonate, (b) exposing said plate to light through the first mask in said set, (c) nucleating a metallic latent image upon said plate by immersion in an aqueous disproportionation bath comprising mercurous and silver ions, (d) physically developing said plate by immersion in a cationic stabilized solution containing silver nitrate and a reducing agent to form a visible metallic image, (e) repeating the foregoing sequence of steps for each mask in said set and visually examining the resultant plate to determine registration of the visible metallic images, the said plate being resensitized prior to each image-wise exposure through a different mask.

2. A method for adding information in the form of optically dense regions to existing emulsion photomasks having a metallic image formed by sensitizing said emulsion photomask by immersion in an aqueous solution of a light sensitive aromatic diazo sulfonate, exposing said photomask through a mask containing the negative of the information to be added, nucleating a metallic latent image in the exposed region by immersion in an aqueous disproportionation bath comprising mercurous and silver ions, and physically developing said photomask by immersion in a solution containing silver nitrate, a reducing agent and a cationic stabilizer to form a visible metallic image, comprising the steps of (a) resensitizing said emulsion photomask by immersion in an aqueous solution of a light sensitive aromatic diazosulfonate, (b) exposing said photomask through a mask containing the negative of the information to be added, (c) nucleating a metallic latent image in the exposed region by immersion in an aqueous disproportionation bath comprising mercurous and silver ions and, (d) physically developing said photomask by immersion in a solution containing silver nitrate, a reducing agent and a cationic stabilizer to form a visible metallic image.

3. Method in accordance with claims 1 and 2 wherein said plate is exposed to light having a wavelength within the range of 325–450 nanometers.

4. Method in accordance with claims 1 and 2 wherein said reducing agent comprises a ferrous-ferric redox couple.

References Cited

UNITED STATES PATENTS

| | | | |
|---|---|---|---|
| 3,403,024 | 9/1968 | Luce | 96—36 |
| 1,349,956 | 8/1920 | Hatt | 96—30 |
| 1,518,426 | 12/1924 | Hatt | 96—30 |
| 1,808,743 | 6/1931 | Barkelew | 96—44 XR |
| 2,790,715 | 4/1957 | Papadakis | 96—13 |
| 3,202,509 | 8/1965 | Drake et al. | 96—36.2 |
| 3,223,525 | 12/1965 | Jonker et al. | 96—36.2 |
| 3,245,794 | 4/1966 | Conley | 96—44 |
| 3,258,337 | 6/1966 | Cousins | 96—35 |
| 3,264,105 | 8/1966 | Houtz | 96—36.2 |
| 3,346,384 | 10/1967 | Gaynor. | |

OTHER REFERENCES

Alink et al., "Journal of the SMPTE," vol. 54, March 1950, pp. 345, 348–349 and 363–366 relied on.

Brace, I. A., "The Graphics Arts Monthly," May 1956, pp. 26–30, 284 relied on.

Hersh, S. L., "Photo Methods for Ind," pp. 88 and 90 relied on.

Preucil, F., The National Lithographer, August 1948, p. 38 relied on.

NORMAN G. TORCHIN, Primary Examiner

C. BOWERS, Assistant Examiner

U.S. Cl. X.R.

96—27, 30, 44, 36.2